J. ELLIOTT.
HARROW.

No. 179,543. Patented July 4, 1876.

WITNESSES:
C. Neveux
John Goethals

INVENTOR:
James Elliott
BY
[signature]
ATTORNEYS.

UNITED STATES PATENT OFFICE.

JAMES ELLIOTT, OF JEFFERSON, WISCONSIN.

IMPROVEMENT IN HARROWS.

Specification forming part of Letters Patent No. 179,543, dated July 4, 1876; application filed May 22, 1876.

*To all whom it may concern:*

Figure 1:
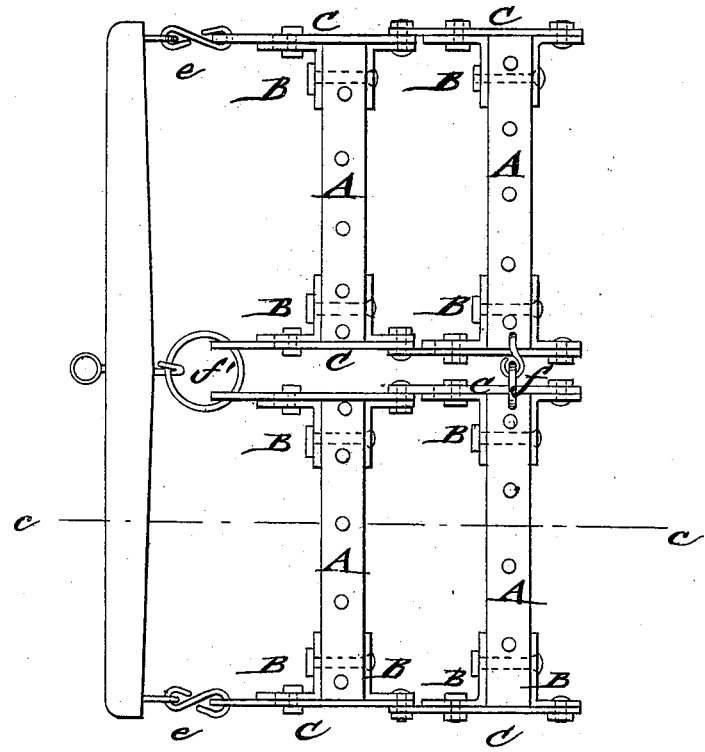
Figure 2:
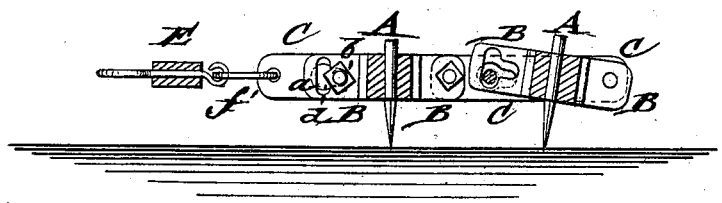

Be it known that I, JAMES ELLIOTT, of Jefferson, in the county of Jefferson and State of Wisconsin, have invented a new and Improved Harrow, of which the following is a specification:

In the accompanying drawing, Figure 1 represents a top view of my improved harrow; Fig. 2, a vertical longitudinal section of the same on line *c c*, Fig. 1.

Similar letters of reference indicate corresponding parts.

This invention has reference to improvements in harrows, so that a number of toothed sections may be connected, and the teeth may be set at any suitable angle of inclination to the ground, and coupled securely together in longitudinal and lateral directions.

The invention consists of a number of toothed harrow-sections that are connected by pivoted side pieces, and made to slant by slotted angular braces and clamp-bolts. The harrow-sections are coupled laterally by interlocking hook devices.

In the drawing, A represents a harrow-section, made of heavy wood, with a number of clod-breaking teeth securely set into the same. Each harrow-section A is applied by angular braces B to connecting side strips C, which are pivoted to the rear brace B of each section, to impart a certain freedom of motion to the same. The front braces B of each section A have T-shaped slots *a*, that serve, in connection with clamp-bolts *b* and slots *d* of the side pieces or strips C, to set the teeth of the harrow-section in perpendicular forward or backward slanting position, as required by the nature of the soil to be worked upon. The side pieces C of the front sections of the harrow are applied by coupling hooks *e* to the draft-bar E, and the sections A placed sidewise of each other, coupled laterally by interlocking hooks *f*, and by a front coupling-ring, *f'*, applied to the draw-bar.

The harrow may be worked by hitching the horses to either end, the connecting-bolts being firmly tightened to the braces and side strips when the teeth are set slanting, which admits the easier penetrating and breaking of hard ground.

Having thus described my invention, what I claim as new, and desire to secure by Letters Patent, is—

The combination of sections A, having clod-breaking teeth, the angular braces B, pivoted slotted strips C, and the clamp-bolts, to adapt the harrow to be used with a singletree, in the manner specified.

JAMES ELLIOTT.

Witnesses:
NICHOLAS STEINAKER,
W. L. McKINNEY.